United States Patent [19]

Fukuda et al.

[11] Patent Number: 4,939,604
[45] Date of Patent: Jul. 3, 1990

[54] MAGNETIC RECORDING AND REPRODUCING APPARATUS AND A MAGNETIC HEAD USED FOR THE APPARATUS

[75] Inventors: Kazumasa Fukuda; Masanori Sakai; Joichiro Ezaki; Mikio Matsuzaki, all of Tokyo, Japan

[73] Assignee: TDK Corporation, Tokyo, Japan

[21] Appl. No.: 327,699

[22] Filed: Mar. 23, 1989

[51] Int. Cl.$^5$ .............................................. G11B 5/60
[52] U.S. Cl. ................................................. 360/103
[58] Field of Search ............................... 360/103, 122

[56] References Cited

U.S. PATENT DOCUMENTS

| 4,081,846 | 3/1978 | Roscamp | 360/103 |
| 4,803,577 | 2/1988 | Ezaki | 360/135 X |

Primary Examiner—A. J. Heinz
Attorney, Agent, or Firm—Oblon, Spivak, McClelland, Maier & Neustadt

[57] ABSTRACT

A magnetic head comprises a slider which holds recording/writing elements at its medium opposing surface constituting a lifting force generating part and the surface area of the medium opposing surface is at most 2 mm$^2$.

A magnetic recording and reproducing apparatus has such magnetic head which is disposed on a magnetic disk having a magnetic recording layer formed on a rigid substrate while the disk is rotated at a high speed so that magnetic recording and reproducing are conducted between the magnetic head and the magnetic disk, wherein the surface roughness R$_{max}$ of the magnetic disk is at most 100 Å.

17 Claims, 5 Drawing Sheets

MAGNETIC RECORDING AND REPRODUCING APPARATUS AND A MAGNETIC HEAD USED FOR THE APPARATUS

BACKGROUND OF THE INVENTION

FIELD OF THE INVENTION

The present invention relates to a magnetic recording and reproducing apparatus and a magnetic head used for the apparatus. More, particularly, it relates to a magnetic head having a slider provided with a surface opposing a magnetic disk, which produces a lifting force for the magnetic head, and a magnetic recording and reproducing apparatus in combination of a magnetic head having a specified surface roughness and the magnetic disk.

It has been known heretofore that, in a magnetic recording and reproducing apparatus, there is employed a flying type magnetic head so designed that it flys with a microscopic gap from a magnetic recording medium by a minute air bearing which is formed due to the dynamic pressure caused when the magnetic recording medium is moved. Some conventional flying type magnetic heads are disclosed in, for example, Japanese Examined Patent Publication Nos. 21329/1983, 28650/1983 and so forth. The basic construction described therein is such that reading/writing elements are attached to the air discharge end of a slider having a flying plane on its one side opposed to a magnetic recording medium.

FIG. 11 is a perspective view of such exemplary conventional magnetic head, wherein there are shown a slider 1 composed of a ceramic material or the like, and reading/writing elements 2. The slider 1 has, on its one surface opposed to a magnetic recording medium, two rails 101, 102 which are spaced apart from each other and have flying planes 103, 104 defined with a high flatness. On the flying planes 103, 104, tapered portions 103a, 104a are formed at the inflow ends thereof relative to an air stream flowing in the direction indicated by an arrow mark a in a combination with the magnetic recording medium. The reading/writing elements 2 are thin-layer elements produced by the same process as in the IC manufacture technology and attached to the air discharge end on the reverse side with respect to the tapered portions 103a, 104a.

In the use for a magnetic recording and reproducing apparatus, the magnetic head is secured to the fore end of an unshown gimbal support device and the flying planes 103, 104 of the slider 1 are brought into elastic contact with the surface of the magnetic disk. And the magnetic head held in such a state is driven in the so-called contact start-stop mode. When the magnetic disk is kept still, the flying planes 103, 104 of the slider 1 are pressed elastically against the dick surface. But upon start of rotation of the magnetic disk, as illustrated in FIG. 12, a lifting dynamic pressure is exerted on the flying planes 103, 104 of the slider 1 including the tapered portions 103a, 104a, so that the magnetic head is caused to fly by a flying height q based on the balance between such dynamic pressure and the resilient pressure P of the gimbal spring.

In this case, operations were carried out at a region where the flying height g was about 0.3 μm.

In the conventional magnetic recording and reproducing apparatus of this kind, the flying height g of the magnetic head should be small as possible to realize high density recording. However, there has been a basic idea that the magnetic head has to be floated. In such circumstances, only measures have been taken to alter the shape of the rail portions or the tapered portions in order to reduce a flying height. Therefore, there was a limit in reducing the flying height.

The present invention is to break the limit of the conventional flying type magnetic recording and reproducing apparatus, and to provide a magnetic recording and reproducing system wherein a magnetic head is opposed to a magnetic recording medium with an extremely small flying height which can be considered to be a substantially contacting state (hereinbelow, referred to as a nearly contacting system). In order to realize a nearly contacting type magnetic recording an reproducing apparatus and a magnetic head used for the apparatus, it is necessary to resolve the following problem.

Since a magnetic head is actuated at an extremely small flying height which can be considered to be a substantially contacting state in such apparatus, a damage such as a crash of the magnetic disk may occur by the hiting of the magnetic head against the magnetic disk, and the durability is decreased.

On the other hand, when the surface properties of the magnetic disk are increased to thereby improve the durability, the magnetic head is apt be strongly attracted to the surface of the magnetic disk due to influence of moisture or water component in air. Since the conventional magnetic recording and reproducing apparatus of this kind is driven by a contact start-stop mode as described before, it becomes inoperable when the magnetic head is attracted to the disk.

As described above, when the nearly contacting magnetic recording and reproducing apparatus is manufactured, there arises a contradictory relation between the improvement of the durability and the prevention of a phenomenon of the attraction, which was difficult to resolve. Accordingly, the nearly contacting system has remained only as an idea.

SUMMARY OF THE INVENTION

It is an object of the present invention to provide a magnetic recording and reproducing apparatus and a magnetic head used for the apparatus capable of avoiding a phenomenon of attaracting a magnetic head to a magnetic disk to thereby improve the durability of the magnetic disk and the magnetic head.

In accordance with the present invention, there is provided a magnetic recording and reproducing apparatus of a type wherein a magnetic head is disposed on a magnetic disk having a magnetic recording layer formed on a rigid substrate while the disk is rotated at a high speed so that magnetic recording and reproducing are conducted between the magnetic head and the magnetic disk, characterized in that the surface roughness $R_{max}$ of the magnetic disk is at most 100 Å and the surface area of a medium opposing surface of a slider holding reading/writing elements is at most 2 mm$^2$, the surface of the slider facing the magnetic disk and constituting a lifting force generating part.

In accordance with the present invention, there is provided a magnetic head which comprises a slider which holds reading/writing elements at its medium opposing surface constituting a lifting force generating part, wherein the surface area of the medium opposing surface is at most 2 mm$^2$.

BRIEF DESCRIPTION OF DRAWINGS

A more complete appreciation of the invention and many of the attendent advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
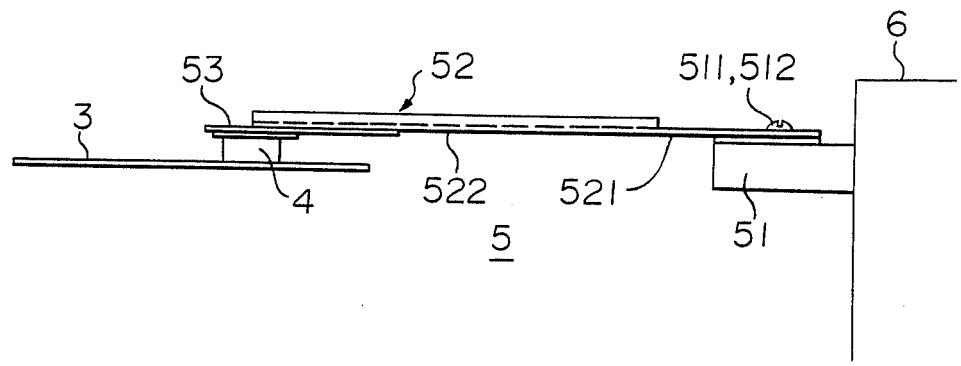
FIG. 1 is a front view of a embodiment of the magnetic recording and reproducing apparatus according to the present invention.
Figure 2:
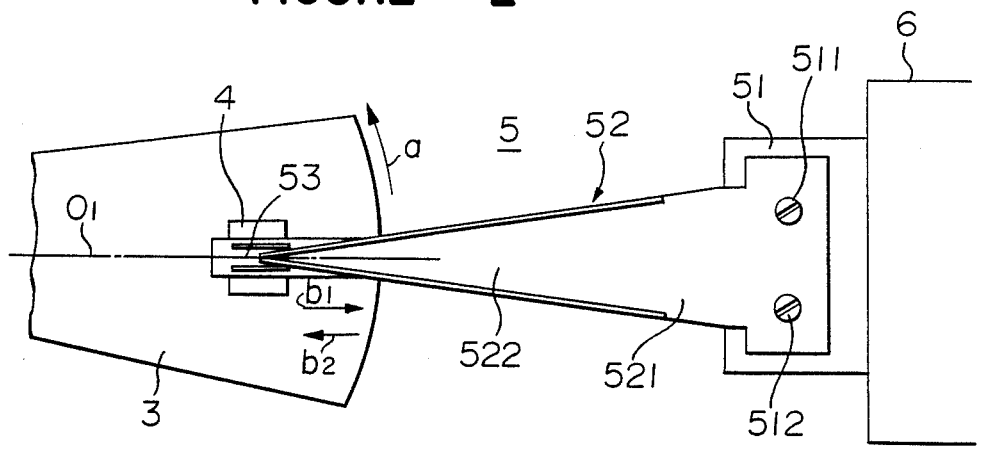
FIG. 2 is a plane view of the same.

Hereinbelow, exemplary embodiments of the present invention will be described in detail with reference to the accompanying drawings. FIG. 1 is a front view of an important part of an embodiment of the magnetic recording and reproducing apparatus according to the present invention and FIG. 2 is a plane view of the same. In the drawings, reference numeral 3 indicates a magnetic disk, numeral 4 indicates a magnetic head, numeral 5 indicates a gimbal supporting device, and numeral 6 indicates a positioning device. The magnetic disk 3 is rotationally driven in the directin of an arrow a by a rotational drive mechanism (not shown). The magnetic head 4 is supported by the gimbal supporting device 5 so as to bear a load and to be permitted to effect pitching motion and a rolling motion.

The supporting device 5 comprises a supporter 52 made of a resilient thin metal plate, one end of which is secured by fastening means 511 and 512 to a rigid arm 51, which is attached to the positioning device 6. At the free end in the longitudinal direction of the supporter 52, a flexible member 53 is attached. On the lower surface of this flexible member 53, a magnetic head 4 is attached The supporter 52 has a resilient spring portion 521 which is attached to the rigid arm 51. A rigid beam portion 522 is formed continuously from this resilient spring portion 521. The supporting device 5 is driven by the positioning device 6 in the direction of an arrow $b_1$ or $b_2$ along the rotational diameter $O_1$ for positioning, whereby the magnetic recording or reproduction is conducted at a predetermined track between the magnetic disk 3 and the magnetic head 4.

Figure 3:
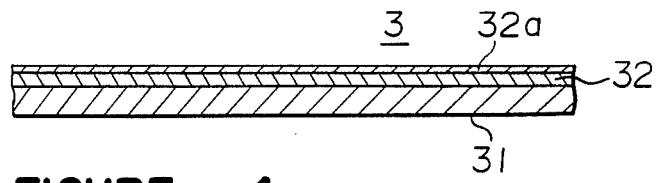
FIG. 3 is an enlarged cross sectional view partly broken of a magnetic disk which constitutes a structural element of the magnetic recording and reproducing apparatus of the present invention.
Figure 4:
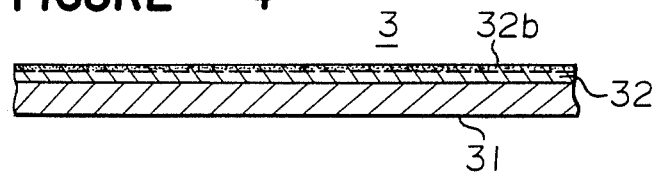
FIG. 4 is an enlarged cross-sectional view partly broken of another embodiment of the magnetic head of the present invention.

The magnetic disk 3 is a medium having good surface properties with a surface roughness $R_{max}$ of at most 100 Å, preferably at most 50 Å. As shown in FIG. 3, the magnetic disk 3 comprises a rigid substrate 31 and a magnetic recording layer 32 formed on the surface of the substrate by a vacuum depositing method. The magnetic recording layer 32 is formed as a thin magnetic layer of e.g. $\gamma\text{-Fe}_2\text{O}_3$ or Co-Ni or Co-Cr. The thickness of the magnetic recording layer 32 formed by the vacuum depositing method is at most about 0.5 μm, and therefore the surface properties of the rigid substrate 31 is reflected as the surface properties in the recording layer 32. Accordingly, as the rigid substrate 31, the one having a surface roughness $R_{max}$ of at most 100 Å is employed. As specific examples of such a rigid substrate, rigid substrates composed essentially of glass, chemically reinforced soda alumino silicate glass or ceramics are suitable. When the surface roughness $R_{max}$ is at most 100 Å, especially at most 50 Å, collision of the magnetic head to the magnetic disk can be avoided even when they are actuated under a nearly contacting state. Accordingly, the durability can be improved.

The magnetic recording layer 32 may be constituted by a magnetic iron oxide such as $\gamma\text{-Fe}_2\text{O}_3$ or a magnetic nitride. Further, when the magnetic layer is made of a metal or alloy, it is advisable to form an oxide layer or a nitride layer 32a on its surface as shown in FIG. 3, or it is advisable to convert the surface into an oxidized coating film 32b. Thus, the durability of the magnetic recording layer 32 can be improved, and it is possible to prevent a damage to the magnetic disk 3. The oxide layer or the nitride layer 32a can be formed by reactive sputtering or by reactive vapor deposition. The oxidized coating film 32b may be formed by intentionally oxidizing the surface of the magnetic recording layer 32 made of a metal or alloy containing at least one member of iron, cobalt and nickel, such as Co-Ni or Co-Cr, by e.g. reactive plasma treatment. The magnetic disk 3 may be of a vertical recording type wherein the recording residual magnetization is composed essentially of a component perpendicular to the recording layer or of an in-plane recording type wherein the recording residual magnetization is composed essentially of a component in the same plane as the recording layer. A lubricant may be coated on the surface of the magnetic recording layer 32 although such an embodiment is not shown in the drawings.

The magnetic head is so constructed that reading and writing elements are held by the slider having a surface area of 2 mm² as a medium opposing surface which constitutes a lifting force generating part.

Figure 5:
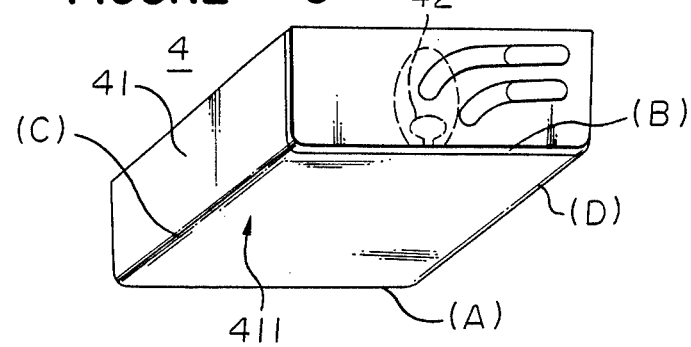
FIG. 5 is a perspective view of an embodiment of the magnetic head of the present invention.

FIG. 5 is a perspective view of an embodiment of the magnetic head of the present invention, wherein reference numeral 41 designates a slider and numeral 42 designates a reading/writing element. The medium opposing surface 411 of the slider 41 is formed to have a flat surface without having any rail portion and the surface area of the medium opposing surface 411 is determined to be 2 mm² or less. Portions A, B of the medium opposing surface 411 viewed from the direction a of an air flow are preferably formed in a curved shape so as not to contact the slider 41 with the surface of the magnetic disk 3 at the time of contact-start. Other ends C, D may also be formed in a curved form. Since the shape of the slider 41 can be simplified in the above-mentioned embodiment, manufacturing work can be easy and cost for manufacturing can be reduced.

Figure 6:
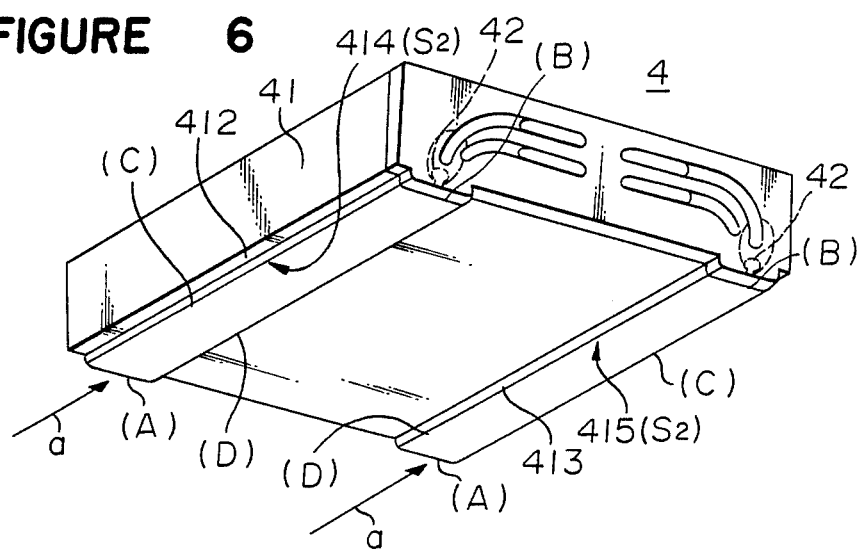
FIG. 6 is a perspective view of another embodiment of the magnetic head of the present invention.

FIG. 6 is a perspective view of another embodiment of the magnetic head of the present invention. In this embodiment, the slider 41 comprises two rail portions 411, 413 so that the surfaces of the rail portions 411, 413 can be utilized as medium opposing surfaces 414, 415 as lifting force generating parts. When the surface areas of the medium opposing surfaces 414, 415 are respectively determined as S1 and S2, the sum of the surface areas (S1+S2) is determined to be 2 mm$^2$ or less. The medium opposing surfaces 414, 415 of the slider 41 are formed to be flat planes without having tapered planes for generating a lifting force. A single rail portion may be formed at an intermediate portion in the width direction so that the surface area of the rail portion is used as a medium opposing surface having a surface area of at most 2 mm$^2$ although the single rail portion is not shown in the drawing.

In the embodiments described above, a tapered plane or planes are not formed in the medium opposing surface or surfaces. However, the present invention is not limited to the above-mentioned embodiments, and a tapered plane or planes may be formed as desired.

Figure 7:
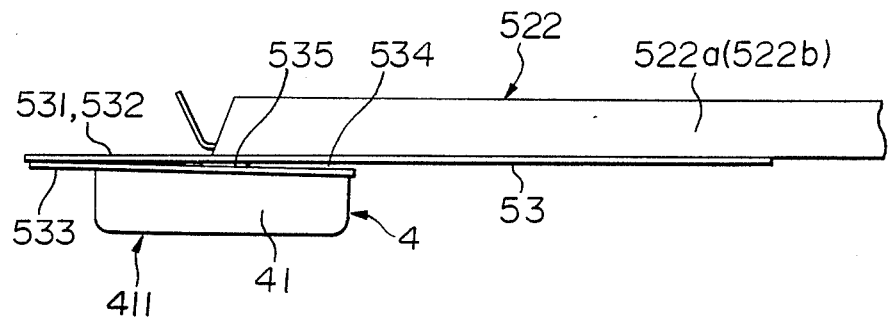
FIG. 7 is a front view showing an assembly of a magnetic head and a supporting device used for the present invention.
Figure 8:
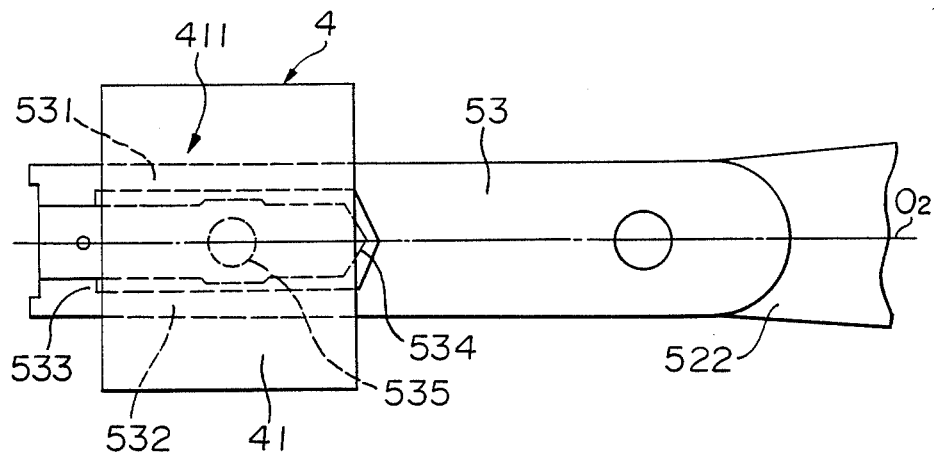
FIG. 8 is a plane view of the assembly as shown in FIG. 7.

FIGS. 7 and 8 are diagrams showing an assembled structure of the magnetic head 4 and the supporting device 5 as shown in FIG. 5 wherein the magnetic head 4 is attached to the lower surface of the flexible member which is attached to the free end of the supporter 52. The rigid beam portion 522 of the supporter 52 has flanges 522a and 522b formed by bending the beam portion along both sides.

The flexible member 53 comprises two flexible outer frame portions 531 and 532 extending substantially in parallel with the axial line in the longitudinal direction of the supporter 52, a lateral frame 533 connecting the flexible outer frame portions 531 and 532 at the end far from the supporter 52 and a central tongue portion 534 extending substantially in parallel with the flexible outer frame portions 531 and 532 from about the center of the lateral frame 533 and having its forward end as a free end. One end opposite to the end having the lateral frame 533 is connected to near the free end of the supporter 52 by means of e.g. welding.

A loading projection 535 in a semi-spherical form is provided on the upper surface of the central tongue portion 534 of the flexible member 53 so that a loading force is transmitted from the free end of the supporter 52 to the central tongue portion 534. The surface of the magnetic head 4 is bonded to the lower surface of the central tongue portion 534 by means of, for instance, an adhesive.

Figure 9:
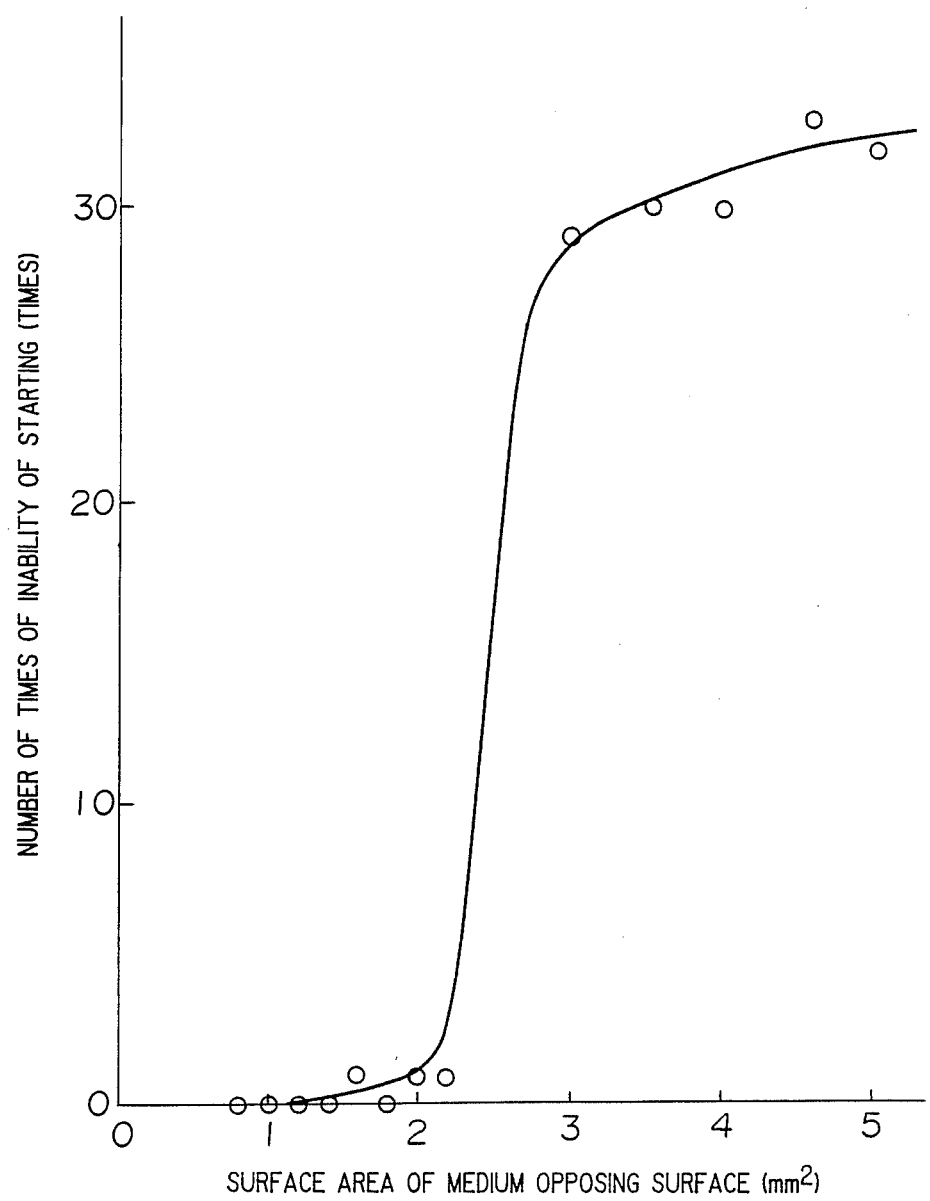
FIG. 9 is a diagram showing a relation of the surface area of the medium opposing surface of the magnetic head to the number of times of inability of starting.
Figure 10:
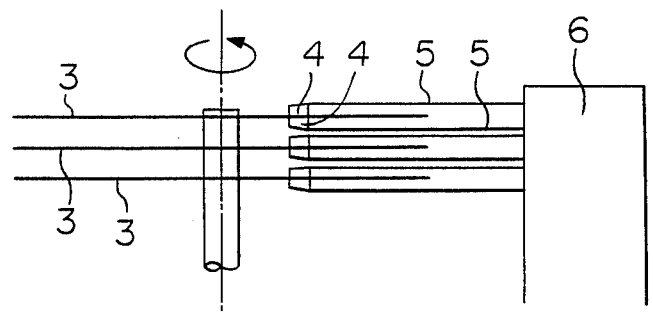
FIG. 10 is a diagram showing the structure of a magnetic recording and reproducing apparatus used for obtaining the data as shown in FIG. 9.
Figure 11:
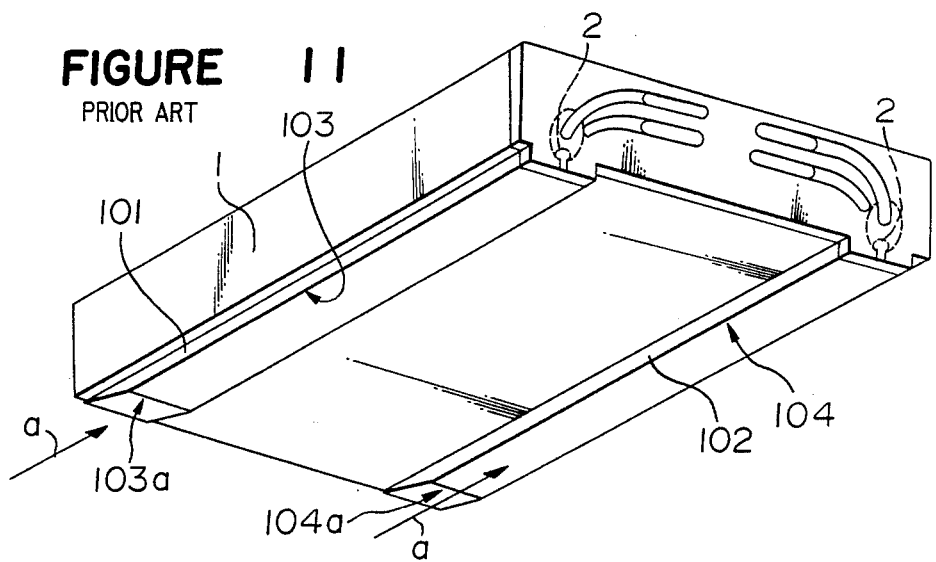
FIG. 11 is a perspective view of a conventional magnetic head.
Figure 12:
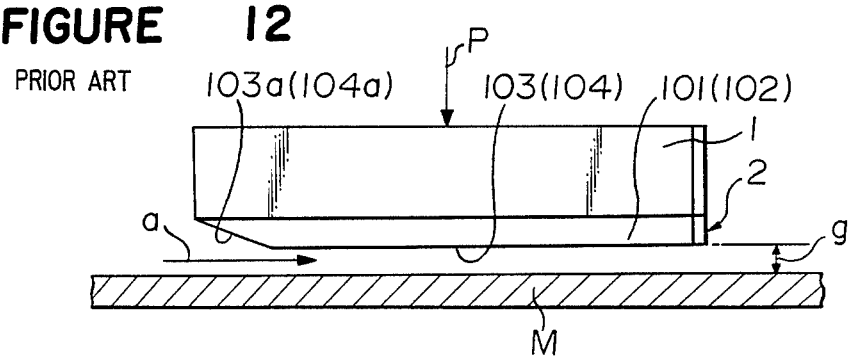
FIG. 12 is a diagram showing the construction of the conventional magnetic recording and reproducing apparatus in a form of model.

FIG. 9 is a diagram showing a relation of the surface area of the medium opposing surface of the magnetic head to the number of times of inability of starting of the head. FIG. 10 is a diagram showing the construction of the magnetic recording and reproducing apparatus used for obtaining the data of FIG. 9. In FIG. 10, three 5.5 inch magnetic disks 3 are arranged and magnetic heads are supported by supporting devices 5 so that the magnetic heads 4 are arragned to face both surfaces of each of the magnetic disks 3. Conditions of measurement are as follows.

A method of test: a contact start-stop mode
The number of starting: 200,000/sample
Surface roughness $R_{max}$ of magnetic disks: $R_{max} < 100$ Å
Torque T of starting of a spindle motor: T=200 gf·cm As is clear from the data in FIG. 9, there is a point of inflection near a surface area of 2 mm$^2$ of the medium opposing surface of the magnetic head 4, and the number of times of inability of starting is extremely low in the area lower than 2 mm$^2$. Especially, there is low inability of starting at the area less than 1 mm$^2$ in starting tests of 200,000 times. On the other hand, the number of times of inability of starting jumps to more than 30 times when the surface area exceeds 2 mm$^2$.

As described above, in accordance with the magnetic recording and reproducing apparatus of the present invention, the durability does not decrease and no attraction of the head to the disk takes place even when they are actuated in a nearly contacting mode.

Obviously, numerous modifications and variations of the present invention are possible in light of the above teachings. It is therefore to be understood that within the scope of the appended claims, the invention may be practiced otherwise than as specifically described herein.

What is claimed is:

1. A magnetic recording and reproducing apparatus of a type wherein a magnetic head is disposed on a magnetic disk having a magnetic recording layer formed on a rigid substrate while the disk is rotated at a high speed so that magnetic recording and reproducing are conducted between the magnetic head and the magnetic disk, characterized in that the surface roughness $R_{max}$ of the magnetic disk is at most 100 Å and the surface area of a medium opposing surface of a slider holding reading/writing elements is at most 2 mm$^2$, the surface of the slider facing the magnetic disk and constituting a lifting force generating part.

2. The magnetic recording and reproducing apparatus according to claim 1, wherein said rigid substrate has surface roughness $R_{max}$ of at most 100 Å.

3. The magnetic recording and reproducing apparatus according to claim 1, wherein said substrate is composed essentially of glass.

4. The magnetic recording and reproducing apparatus according to claim 1, wherein said rigid substrate is composed essentially of chemically reinforced soda alumino silicate glass.

5. The magnetic recording and reproducing apparatus according to claim 1, wherein said substrate is made of ceramics.

6. The magnetic recording and reproducing apparatus according to claim 1, wherein the magnetic recording layer is formed by vacuum depositing.

7. The magnetic recording and reproducing apparatus according to claim 1, wherein the magnetic recording layer constitutes an oxide layer or a nitride layer at its surface layer.

8. The magnetic recording and reproducing apparatus according to claim 7, wherein the oxide layer and the nitride layer are formed by reactive sputtering or reactive vapor deposition.

9. The magnetic recording and reproducing apparatus according to claim 1, wherein the magnetic recording layer has an oxidized coating film at its surface.

10. The magnetic recording and reproducing apparatus according to claim 9, wherein the oxidized coating film is formed by oxidizing the surface of the magnetic recording layer composed of a metal or alloy comprising at least one member selected from the group consisting of iron, cobalt and nickel, by e.g. reactive plasma treatment.

11. The magnetic recording and reproducing apparatus according to claim 1, wherein the recording residual magnetization of the magnetic recording layer is composed essentially of a component perpendicular to the magnetic recording layer.

12. The magnetic recording and reproducing apparatus according to claim 1, wherein the recording residual magnetization of the magnetic recording layer is composed essentially of a component in the same plane as the magnetic recording layer.

13. A magnetic head which comprises a slider which holds recording/writing elements at its medium opposing surface constituting a lifting force generating part, wherein the surface area of the medium opposing surface is at most 2 mm$^2$.

14. The magnetic head according to claim 13, wherein the surface area of the medium opposing surface is at most 1 mm$^2$.

15. The magnetic head according to claim 13, wherein the medium opposing surface is formed by the surface of rail portions formed in parallel to the direction of an air stream.

16. The magnetic head according to claim 13, wherein the medium opposing surface has a tapered plane at an inflow end.

17. The magnetic head according to claim 13, wherein the medium opposing surface is made flat without a tapered plane at an inflow end.

* * * * *

UNITED STATES PATENT AND TRADEMARK OFFICE
CERTIFICATE OF CORRECTION

PATENT NO. : 4,939,604
DATED : 07/03/90
INVENTOR(S) : Kazamusa Fukuda et al

It is certified that error appears in the above-indentified patent and that said Letters Patent is hereby corrected as shown below:

On the title page, in the illustrated figure, and in sheet 2 of 5:

In Figure 6, change "414 (S2)" to --414 (S1)--;
delete "(C)" and "(D)" (double occurrence).

In column 5, line 9, change "411, 413" to --412, 413-- (double occurrence).

Signed and Sealed this

Third Day of January, 1995

*Attest:*

BRUCE LEHMAN

*Attesting Officer*     *Commissioner of Patents and Trademarks*